(12) United States Patent
Beffrieu

(10) Patent No.: US 6,736,385 B1
(45) Date of Patent: May 18, 2004

(54) CENTERING AND CLAMPING TOOL

(75) Inventor: Michel Beffrieu, 27, avenue Foch, F-93460 Gournay (FR)

(73) Assignee: Michel Beffrieu, Gournay (FR)

( * ) Notice: Subject to any disclaimer, the term of this patent is extended or adjusted under 35 U.S.C. 154(b) by 156 days.

(21) Appl. No.: 10/018,247

(22) PCT Filed: Jun. 16, 2000

(86) PCT No.: PCT/FR00/01671

§ 371 (c)(1), (2), (4) Date: Mar. 15, 2002

(87) PCT Pub. No.: WO00/78507

PCT Pub. Date: Dec. 28, 2000

(30) Foreign Application Priority Data

Jun. 18, 1999 (FR) .............................. 99 07749

(51) Int. Cl.⁷ ............................... B23Q 11/00
(52) U.S. Cl. ............................ 269/49; 269/47; 269/32; 269/52
(58) Field of Search .............................. 269/32, 47, 49, 269/52, 93, 53, 54.1, 296, 48.1, 48.2, 48.3, 309, 310, 900, 50; 279/206, 219; 403/257; 188/67, 31, 69, 60

(56) References Cited

U.S. PATENT DOCUMENTS 4,191,366 A * 3/1980 Rabin .......................... 269/47
4,488,713 A * 12/1984 Kosmal et al. ................ 269/25
4,928,934 A * 5/1990 Morton, Jr. .................. 206/728
5,247,846 A * 9/1993 Grossmann et al. ......... 47/99 R
5,694,814 A * 12/1997 Gardam ........................ 74/526
6,164,634 A * 12/2000 Farlow ......................... 269/47
6,364,300 B1 * 4/2002 Kita ............................. 269/32

FOREIGN PATENT DOCUMENTS

| DE | 297 13 607 U1 | 9/1997 |
| FR | 2 733 930 | 11/1996 |
| FR | 2 757 437 | 6/1998 |

* cited by examiner

Primary Examiner—Joseph J. Hail, III
Assistant Examiner—Daniel Shanley
(74) Attorney, Agent, or Firm—Young & Thompson

(57) ABSTRACT

A tool (1) for centering and gripping a part (10) to be secured, having a through passage (10a) and sized for the tool (1), includes a guide member (3), at least one gripping element (4) mounted on the guide member (3) and a body (2) enclosing the drive and guide element of the tool (1). The guide member is mounted on a securement support having a support part (6) provided with a passage (7). The guide member (3) projects at the free end of the support part (6), the free end constituting the reference surface or support surface (9) of the part (10) to be secured whilst the body (2) of the tool (1) is gripped against a surface of the support opposite the support part (6).

7 Claims, 2 Drawing Sheets

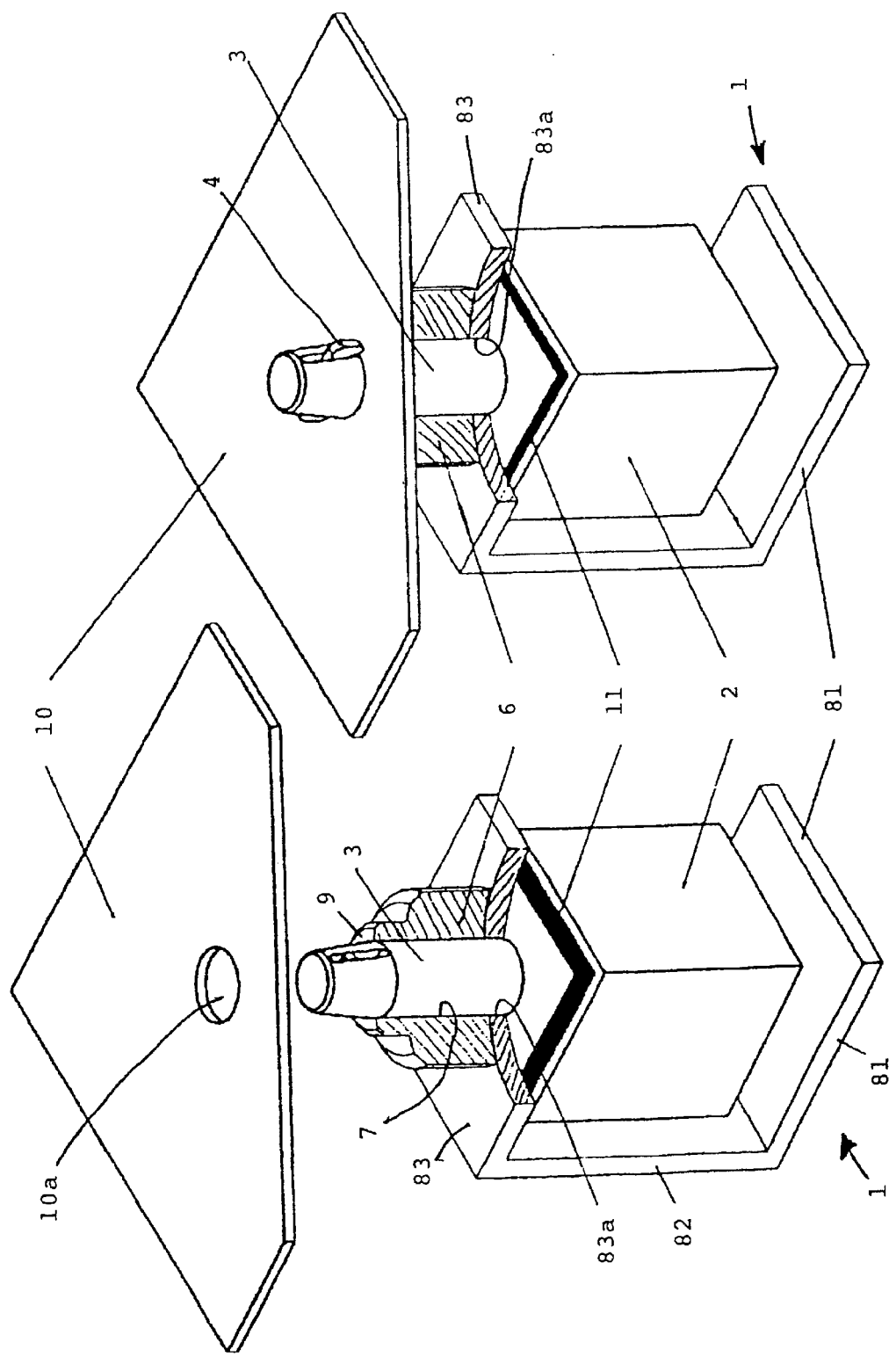

CENTERING AND CLAMPING TOOL

The present invention relates to a centering and gripping tool for at least one part to be fixed in position.

Centering and/or gripping tools are generally mounted securely on carrier frames. Such a centering and gripping tool can be for example of the type described in French patent 2 757 437 and comprises a guide member carried at the end of a casing or body and gripping members as well as pivotal and translatory guide means for the gripping members between a centering position in which the gripping members are retracted inwardly of the guide member and a plurality of gripping positions in which the gripping members project outwardly of the guide member, said guide means being arranged to product simultaneously the pivotal and translatory drive of said gripping members.

So as to promote good gripping behavior, there is generally provided a reference surface or bearing surface on the casing, for example with the help of a corresponding member surrounding the guide member, and against which the part to be secured rests, facing the gripping means in the deployed position.

This type of centering and gripping tool is thus used to secure parts of the same type, which is to say that they generally have a through passage of the same diameter and whose constant thickness corresponds to the given interval between the bearing surface and the part and the gripping means in the gripping position.

A problem thus arises when it is desired to use this centering and gripping tool for a part having a through passage of the same diameter but which has a different thickness. It is then necessary to exchange the tool for another corresponding to the new thickness, which is to say whose given interval between the bearing surface and the part and the gripping means is suitable for this new part.

Another possibility consists in modifying the part forming the bearing surface and which is fixed on the casing to define this new interval.

In both cases, this gives rise to a loss of time to the extent to which it is necessary to dismount the centering and gripping tool and then to mount a new tool or to modify this tool.

So as to overcome this drawback, the present invention has for its object to provide a centering and gripping tool which permits easily dismounting the centering and gripping tool and to effect in a simple manner the gripping of the pieces having the same diameter for centering but which can be of different thicknesses.

To this end, the invention has for its object a centering and gripping tool for a part to be secured, comprising a through passage and adapted for said tool, said tool comprising a guide member, at least one gripping means mounted on the guide member, and a body enclosing the drive and guide means for said tool said gripping means being movable, under the action of drive means, between a centering position in which it is retracted within the guide member and a gripping position in which it projects outside the guide member such that the part to be secured is gripped between the gripping means and a support surface, said tool also comprising a securement support comprising a support part provided with a passage in which is mounted the guide member of said tool, said guide member projecting beyond the free end of said guide part, said free end constituting the reference surface or support surface of the part to be secured whilst the body of the tool is gripped against a support surface opposite said support part, characterized in that a removable interchangeable shim is interposed between the body of the tool and the support surface opposite the support part against which the body is secured.

Thus in a preferred manner, the securement support serves for mounting the tool according to the invention on a receiving surface and facilitates changing the tool to the extent to which, the support remaining fixed, only the active portion of the centering and gripping tool is replaced (gripping means—guide member—body) by another on the support.

Thus, the free end of the support part constitutes the reference surface or bearing surface of the part to be secured and the interval between this bearing surface and the gripping means in the gripping position, corresponding to the thickness of the part to be secured, is predetermined by the portion of the guide member projecting from the passage of said support part. As a result, the interposition or not of a shim between the body and the support surface opposite to the support part permits modifying this interval because it influences the projection of the guide member at the free end of the support part.

Because of this, the thickness of the shim interposed between the body of the centering and gripping tool and the support surface against which is gripped said body, contributes to define the size of the interval.

Thus, the securement support of the centering and gripping tool according to the invention facilitates not only changing the tool but also permits defining for a same tool a support surface for the part to be secured, whose distance relative to the gripping means in the gripping position can vary because of the positioning of this tool in the support.

As a result, when the part to be gripped changes and has a different thickness, the interval between the gripping means in the gripping position and the support surface can be modified, this modification of the interval being thus able to be carried out in a simple manner by positioning a shim of a suitable thickness or by changing a shim already installed and replacing it with a shim of another suitable thickness.

Thus, the centering and gripping tool according to the invention is usable for parts provided with a through passage of the same diameter but having different thicknesses, by simple emplacement or changing of the interchangeable removable shim.

According to a first modification of this embodiment, the shim is rigid and its thickness corresponds to a predetermined size interval.

According to a second modification of this embodiment of the invention, the shim is resiliently deformable and can be made for example of an elastically deformable material or else have a structure with a resilient deformation property such as a Belleville washer such that, during variations of the thickness of the parts to be gripped, the resilient deformability of the shim permits compensation of these variations by permitting an axial displacement of the centering and gripping tool relative to the securement support to permit good positioning of the gripping means and hence a perfect holding of the part. Thus, the thickness of the shim defines the interval between the support surface and the gripping means but moreover, its deformability permits an adaptation of this interval resulting from differences in the thickness of parts, for example that are supposed to be of the same thickness.

There will now be described an example of embodiment of the invention in greater detail with reference to the accompanying drawings, in which:

FIG. 1 is a perspective view from above of a centering and gripping tool according to the invention;

FIG. 2 is a perspective view from above according to FIG. 1, in a centering and gripping position of a part.

Figure 3:
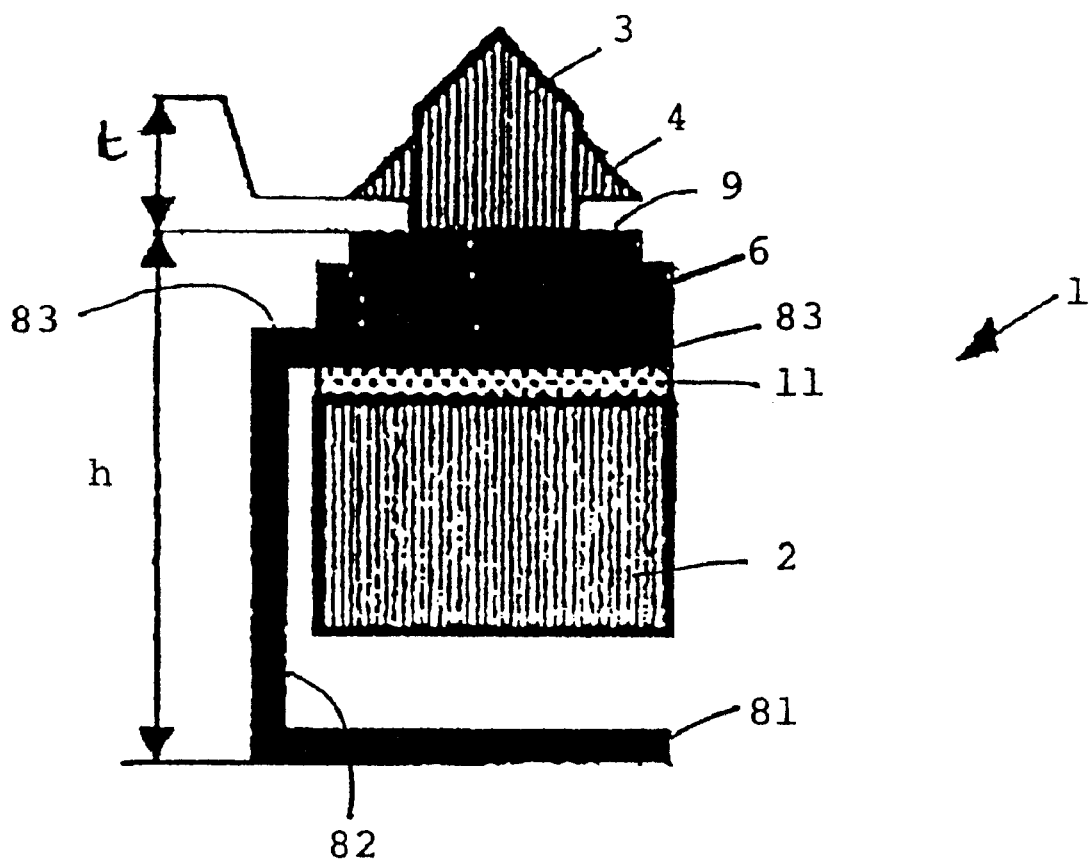
FIG. 3 is a schematic side view of a centering and gripping member according to the invention.

A centering and gripping tool 1 according to the invention comprises a body 2 surmounted by a guide member 3 within which are mounted gripping members 4 such as fingers drivable in translation and in rotation between a position in which they are retracted into the guide member 3 and a position in which they are extended under the force of drive means enclosed in the body 2.

The centering and gripping tool moreover comprises a securement support comprising a support part 6 provided with a passage 7 and a securement angle member 8 having a substantially U shape, one of the wings 82 of the U and its base 81 being adapted for the securement of the centering and gripping tool whilst the other wing 83 of the U is secured to the support part 6 and has a through passage 83a provided in prolongation of the passage 7. The securement support thus has securement means on a reception surface and it can also have the form of a casing whose surfaces and base can serve for securement.

The guide member 3 is mounted in the passage 7 of the support part 6 so as to project at the free end of the support part 6 such that this free end constitutes a reference surface or support surface 9 for the part 10 to be secured, provided with a through passage 10a.

The body 2 is gripped against the surface of the support opposite to the support part 6 by any means known per se. Preferably, the gripping means for the body against the support surface are easily manipulable to permit rapid ungripping of the body 2, either for its replacement by another tool, or for emplacement of an interchangeable shim 11 interposed between the support and the body 2.

An interval t defined between the fingers 4 in extended position (see FIG. 3) and the reference surface 9 corresponds to the thickness of the part 10 to be gripped.

So as to permit a variation of this interval t corresponding to a variation of the thickness of the part 10 to be gripped, the removable and interchangeable shim 11 is interposed between the support and the body 2.

Thus, it suffices to modify the thickness of the shim 11 to modify the size of the interval t, the height h (base to reference surface 9) corresponding to the assembly of the securement support and centering and securement tool or remaining unchanged.

In this way, when it is desired to use a centering and gripping tool comprising such a support for parts of one thickness, and then for parts of other thicknesses, the assembly is modified by changing the shim 11 correspondingly. It is not necessary to do more toward the complete disassembling of the centering and gripping tool.

Preferably, the shim 11 is resiliently deformable and is made of a resiliently deformable material such as an elastomer which, during operation of the gripping and centering tool, permits axial displacement of the latter and hence modifications of the interval t so as to compensate variations in the thickness of the parts to be treated.

Thus, as can be seen in FIG. 2, the shim 11 has been compressed and the value of this compression permits axial displacement of the guide member correspondingly with respect to the support surface 9 so as to modify the interval t to compensate for variation in the thickness of the part 6.

What is claimed is:

1. Centering and gripping tool (1) for a part (10) to be secured, comprising a through passage (10a) sized for said tool (1), said tool comprising a guide member (3) sized to pass through the passage of the part to be secured, at least one gripping means (4) mounted on the guide member (3) and a body (2) enclosing driving and guiding means for said tool (1), said gripping means (4) being movable, under the action of drive means, between a centering position in which it is retracted within the guide member (3) and a gripping position in which it projects to the outside of the guide member (3) such that the part (10) to be secured is gripped between the gripping means (4) and a support surface (9), said tool also comprising a securement support comprising a support part (6) provided with a passage (7) in which is mounted the guide member (3) of said tool (1), said guide member (3) projecting at the free end of said guide part (6), said free end constituting the reference surface or support surface (9) of the part (10) to be secured whilst the body (2) of the tool (1) is gripped against a surface of the support opposite said support part (6), characterized in that a removable interchangeable shim (11) is interposed between the body (2) of the tool and the surface of the support opposite the support part (6) against which the body (2) is gripped, the thickness of the shim (11) interposed between the body (2) of the centering and gripping tool (1) and the support surface against which said body (2) is gripped, contributing to define the size of the interval (t) between the support surface (9) and the part (10) to be secured and the gripping means (4).

2. Centering and gripping tool according to claim 1, characterized in that the shim (11) is rigid and its thickness corresponds to a predetermined interval of size (t).

3. Centering and gripping tool according to claim 1, characterized in that the shim (11) is resiliently deformable.

4. Centering and gripping tool according to claim 3, characterized in that the shim (11) is of a resiliently deformable material such as an elastomer.

5. Centering and gripping tool according to claim 3, characterized in that the shim (11) has a structure for resilient collapsing such as a Belleville washer.

6. Centering and gripping tool according to claim 1, characterized in that the support moreover comprises an angle member of substantially U shape of which one of the wings (82) and the base (81) serve for the securement of the tool, the other wing (83) of the U being secured to the support part (6) and having a through passage (83a) provided in prolongation of the passage (7).

7. Centering and gripping tool according claim 1, characterized in that the support is constituted by a casing of which one surface comprises the support part (6), the other surfaces being adapted to serve for the securement of the tool.

* * * * *